(12) United States Patent
Ramun

(10) Patent No.: US 6,202,308 B1
(45) Date of Patent: Mar. 20, 2001

(54) METAL CUTTING SHEAR WITH INNER BOLT SUPPORT FOR INDEXABLE BLADE INSERT

(75) Inventor: John R. Ramun, Poland Township, OH (US)

(73) Assignee: Allied Gator, Inc., Youngstown, OH (US)

( * ) Notice: Subject to any disclaimer, the term of this patent is extended or adjusted under 35 U.S.C. 154(b) by 0 days.

(21) Appl. No.: 09/347,356

(22) Filed: Jul. 6, 1999

Related U.S. Application Data

(63) Continuation-in-part of application No. 08/824,773, filed on Mar. 26, 1997, now Pat. No. 5,940,971.

(51) Int. Cl.⁷ .................................................. B23P 19/04
(52) U.S. Cl. .......................... 30/134; 241/101.72; 411/531
(58) Field of Search .................... 30/134; 241/101.72, 241/101.74, 101.73; 407/77, 85; 403/282; 52/585.1; 104/106, 107, 111; 411/531, 537, 546

(56) References Cited

U.S. PATENT DOCUMENTS

| | | | |
|---|---|---|---|
| 2,901,787 | 9/1959 | Whistler, Sr. et al. | 403/292 X |
| 3,115,356 | 12/1963 | Hohwart | 411/531 X |
| 3,354,526 | 11/1967 | Erkfritz | 29/96 |
| 3,490,117 | 1/1970 | Hertel | 29/96 |
| 4,403,431 | 9/1983 | Ramun et al. | 37/117.5 |
| 4,450,625 | 5/1984 | Ramun et al. | 30/134 |
| 4,519,135 | 5/1985 | LaBounty | 30/134 |
| 4,645,386 | 2/1987 | Smith | 407/113 |
| 4,670,983 | 6/1987 | Ramun et al. | 30/134 |
| 4,682,916 | 7/1987 | Briese | 407/113 |
| 4,686,767 | 8/1987 | Ramun et al. | 30/134 |
| 4,770,219 | 9/1988 | Blackwell, Jr. | 144/228 |
| 4,897,921 | 2/1990 | Ramun | 30/134 |
| 4,919,573 | 4/1990 | Tsujimura et al. | 407/40 |
| 5,197,193 | 3/1993 | Smith | 30/134 |
| 5,940,971 | * 8/1999 | Ramun | 30/134 |

* cited by examiner

Primary Examiner—Douglas D. Watts
(74) Attorney, Agent, or Firm—Webb Ziesenheim Logsdon Orkin & Hanson, P.C.

(57) ABSTRACT

A reversible, indexable blade insert is removably secured to an anvil of a shear blade by one or more bolts through central bores in the blade insert. Each central bore includes recesses at each end. A support member is provided within the recess of the blade insert central bore on the inner side of the blade insert adjacent the anvil. The support member eliminates the unsupported section of the bolt in the recess, provides a positive blade insert location, and increases the blade insert to anvil surface area friction.

20 Claims, 11 Drawing Sheets

METAL CUTTING SHEAR WITH INNER BOLT SUPPORT FOR INDEXABLE BLADE INSERT

CROSS-REFERENCE TO RELATED APPLICATION

This application is a Continuation-In-Part of U.S. patent application Ser. No. 08/824,773, filed Mar. 26, 1997 now U.S. Pat. No. 5,940,971, entitled "Metal Cutting Shear with Inner Bolt Support for Indexable Blade Insert".

BACKGROUND OF THE INVENTION

1. Field of the Invention

The present invention relates to a heavy-duty shear which is adapted to be attached to a backhoe and, more particularly, the present invention relates to a metal cutting shear with inner plow bolt supports for indexable blade inserts.

2. Background Information

Heavy-duty metal cutting shears of the type that are mounted on backhoes and powered by hydraulic cylinders for efficiently handling scrap are well-known in the art. Examples of these types of shears can be found in U.S. Pat. Nos. 4,403,431; 4,450,625; 4,519,135; 4,670,983; 4,686,767; 4,897,921; and 5,197,193. These heavy-duty shears are designed for efficient handling and shearing of scrap, generally metal scrap, into usable sizes. For example, in dismantling an industrial building, metal scraps in the form of pipes of various diameters and lengths, structural beams, such as I-beams, channels, angles and the like, sheet metal and sheet metal plate must all be efficiently handled and severed by the metal cutting shears. The metal cutting shears are additionally utilized for reducing automobile and truck frames, railroad cars and the like.

These prior art metal cutting shears typically use replaceable blade inserts having at least one cutting edge thereon. When the cutting edge of the blade is worn, the blade inserts can be removed and sharpened or replaced. U.S. Pat. No. 4,897,921 discloses the use of reversible, indexable blade inserts wherein each blade insert has multiple cutting edges thereon which can be indexed to the appropriate operative position. U.S. Pat. No. 5,197,193 discloses similar reversible blade inserts having multiple cutting edges. Typically, the blade inserts of the prior art are held in position by one or more plow bolts extending therethrough into the anvil portion of the fixed or movable blade of the shear. The blade insert is provided with a recessed portion to receive the head of the plow bolt. This attaching arrangement provides some difficulties in reversible blade inserts which are flipped to provide new cutting edges such as in U.S. Pat. Nos. 4,897,921 and 5,197,193 discussed above. These deficiencies can be clarified by reviewing the typical prior art blade insert attachment illustrated in FIG. 1. The reversible, indexable blade insert 10 includes at least one central bore 12 extending therethrough with a pair of generally frustoconically-shaped recesses 14 and 15 at opposite ends of the central bore 12. Each recess 14 and 15 has a shape corresponding to a bolt head 16 of a plow bolt 18. The outwardly facing recess 15 is adapted to receive the bolt head 16 of the plow bolt 18 therein as shown in FIG. 1. The threaded end 19 of the plow bolt 18 opposite the bolt head 16 receives a nut 20 in an anvil recess 21 to secure the blade insert 10 within an insert seat 22 of an anvil 24 of the fixed or movable blade of the shear. The inwardly facing recess 14 butts up against the anvil 24 in the insert seat 22. The inwardly facing recess 14 and the outwardly facing recess 15 will be reversed when the blade insert 10 is flipped over. The anvil 24 includes a bolt-receiving bore 25 extending from the insert seat 22 to the anvil recess 21 and is aligned with the central bore 12 to receive the plow bolt 18 therethrough. A high-collar lock washer 26 is also conventionally provided in the anvil recess 21 around the plow bolt 18 between the nut 20 and the anvil 24. This prior art configuration results in a significant unsupported section 28 along the plow bolt 18 due to the inwardly facing recess 14 adjacent the anvil 24. The unsupported section 28 is undesirable in view of the high cutting forces exerted on the blade insert 10. Moreover, the unsupported section 28 increases the likelihood of mispositioning of the blade insert 10 within the seat 22 and increases the likelihood of the blade insert 10 pulling out from the seat 22.

It is an object of the present invention to overcome the aforementioned drawbacks of the prior art. It is a further object of the present invention to provide an attachment assembly for a reversible, indexable blade insert which includes substantially complete support along the length of the plow bolts. Another object of the present invention is to provide a blade insert attachment assembly which positively locates the blade insert in the anvil seat and effectively increases the blade insert to the anvil surface area to help prevent blade insert pullout. A still further object is to provide a blade insert attachment assembly that can be partially disassembled when access to the reversible, indexable blade insert is obstructed by a jammed workpiece, a second anvil, or other matter.

SUMMARY OF THE INVENTION

A blade for a heavy-duty shear according to the present invention achieves the above objects. The shear blade of the present invention generally includes an anvil portion forming at least one blade insert seat, at least one anvil recess, and at least one bolt-receiving bore. The bolt-receiving bore extends from the blade insert seat to the anvil recess and preferably forms a support member seat. A reversible blade insert is mounted in each blade insert seat. Each blade insert has at least one central bore extending therethrough, aligned with a bolt-receiving bore of the anvil. Each central bore has opposing recesses at each end thereof. A rigid support member is at least partially received within the bolt-receiving bore and the recess of the reversible insert. A bolt extends through the rigid support member and into and through the central bore of the insert.

In one embodiment of the present invention, a head of the bolt is received within an outwardly facing recess of the blade insert. A support member is at least partially received within the inwardly facing recess of the blade insert and at least partially received within a support member seat positioned opposite the anvil recess and adjacent the inwardly facing recess of the blade insert. The support member may be provided with a forward portion which corresponds to the configuration of the recess of the blade insert. A rear portion of the support member may be substantially cylindrical and may be provided with an offset extending substantially perpendicular to the longitudinal length of the support member. The offset is positioned between the rear portion and the front portion of the support member. A shim pack positioned adjacent each support member within the support member seat may also be provided.

In a second embodiment of the present invention, a support member extends the length of the bolt-receiving bore, and may be seated in a support member seat formed by the bolt-receiving bore. A forward portion of the support member is at least partially received within the inwardly facing recess of the blade insert. The support member may be provided with a forward portion which corresponds to the configuration of the recess of the blade insert. A rear portion of the support member may be substantially cylindrical and may be provided with an offset extending substantially perpendicular to the longitudinal length of the support member. The rear portion of the support member may also be provided with tap fittings for receiving tap bolts. A shim pack positioned adjacent each support member within the anvil support member seat may also be provided. A bolt is received by the anvil recess and extends through the center recess of the rigid support member, with a head of the bolt adjacent the anvil recess. A threaded end of the bolt engages a threaded central bore portion of the blade insert.

The present invention additionally provides a heavy-duty shear which is adapted to be attached to a backhoe. The shear comprises a fixed blade, at least one reversible blade insert attached to the fixed blade, a movable blade pivotally attached to the fixed blade, and at least one reversible blade insert attached to the movable blade. The blade inserts of the movable blade cooperate with the blade inserts of the fixed blade to provide a shearing action for the shear. Each blade insert includes at least one central bore extending therethrough with recesses on opposite ends of the central bore. A bolt for each central bore extends through the central bore. A support member is at least partially received within a recess of each blade insert.

These and other advantages of the present invention will be clarified in the description of the preferred embodiments taken together with the attached figures, wherein like reference numerals represent like elements throughout.

DESCRIPTION OF THE PREFERRED EMBODIMENTS

Figure 2:
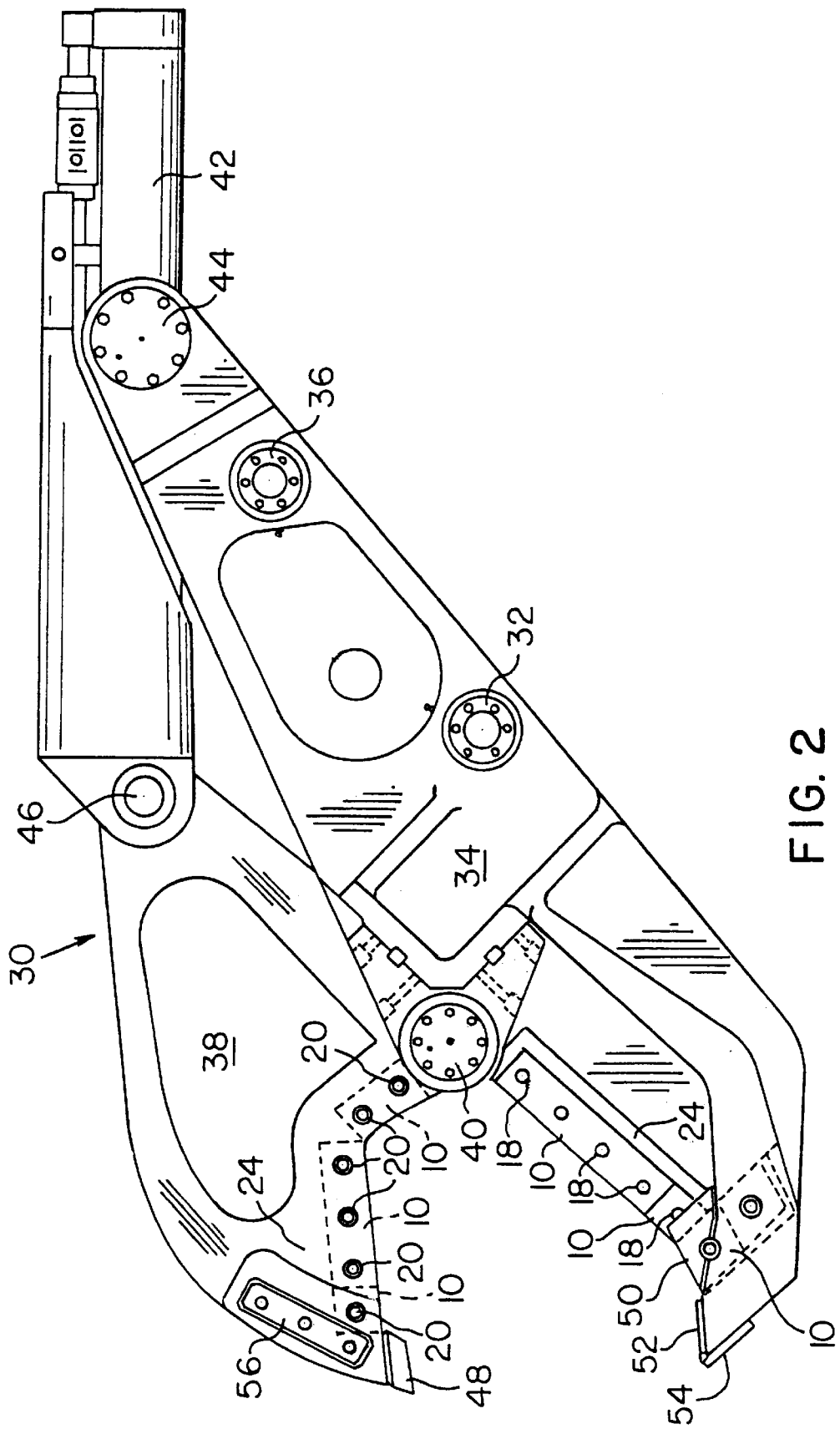
FIG. 2 is a side view of a heavy-duty shear according to one embodiment of the present invention.

FIG. 2 illustrates a shear 30 according to the present invention which is adapted to be attached to a backhoe boom or dipstick (not shown) by a mounting pin extending through bushing 32 on a lower fixed blade 34 of the shear 30. A second bushing 36 on the fixed blade 34 is adapted to be attached to the piston rod of the piston and cylinder assembly of the backhoe which is pivotally attached to the boom or dipstick. The piston and cylinder assembly attached to the second bushing 36 is adapted to pivot the shear 30 about the bushing 32 relative to the boom or dipstick. A movable blade 38 is pivotally attached by a thrust bearing assembly 40 to the fixed blade 34. Hydraulic cylinder assembly 42 is supported on the fixed blade 34 by bearing assembly 44. The piston rod of the hydraulic cylinder assembly 42 is attached to the movable blade 38 by pivot pin 46. Operation of hydraulic cylinder assembly 42 will move the movable blade 38 relative to the fixed blade 34 by pivoting the movable blade 38 about the thrust bearing assembly 40. Hydraulic cylinder assembly 42 and the piston and cylinder assembly attached to the second bushing 36 are controlled by the backhoe operator in a conventional fashion. The fixed blade 34 is generally formed as a pair of spaced plates forming a slot therebetween. The movable blade 38 is adapted to move through the slot closely adjacent at least one of the pairs of spaced plates.

The movable blade 38 includes a plurality of reversible, indexable blade inserts 10 positioned along a side edge thereof. The blade inserts 10 are removably attached to the movable blade 38 as will be described hereinafter. Each of the blade inserts 10 includes a plurality of cutting edges along the side edges thereof. When one of the respective cutting edges of a blade insert 10 is worn down, a new cutting edge can be presented by indexing or reversing the blade insert 10 to present the new cutting edge in the operative position.

The fixed blade 34 includes a plurality of reversible, indexable blade inserts 10 removably attached to the fixed blade 34. A rectangular blade insert 10, a square blade insert 10, and a rhombus-shaped blade insert 10 are attached to the fixed blade 34 as shown in FIG. 2. The blade inserts 10 are removably attached to the fixed blade 34 in the same manner as blade inserts 10 of the movable blade 38 as will be discussed in detail hereinafter. The cutting edges of the blade inserts 10 of the movable blade 38 cooperate with the exposed cutting edges of the blade inserts 10 of the fixed blade 34 to provide a shearing action for the shear 30.

The shear 30 may further include a piercing tip 48 removably attached to the forward portion of the movable blade 38. A guide block 50 is positioned on a side of the slot in the fixed blade 34 at a position where the piercing tip 48 is adapted to extend through the slot. The guide block 50 illustrated in FIG. 2 is adjacent the rhombus-shaped blade insert 10. The shear 30 may further include wear plates 52 and 54 adjacent the forward most portion of the fixed blade 34 and a wear plate 56 attached to the movable blade 38 behind the piercing tip 48 on the side of the movable blade 38. The wear plates 52, 54, and 56 are positioned where significant forces tend to act on the shear 30.

Figure 3:
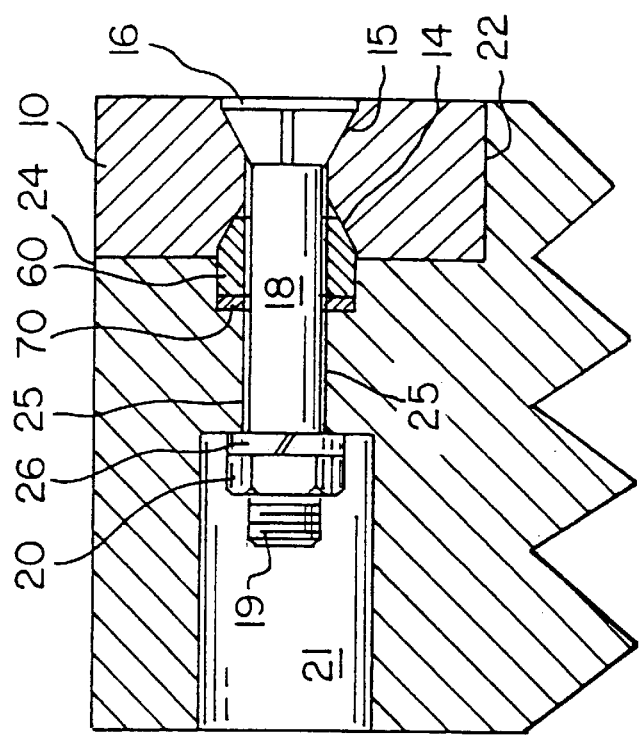
FIG. 3 is a sectional view of a blade insert attachment assembly of the heavy-duty shear illustrated in FIG. 2.
Figure 1:
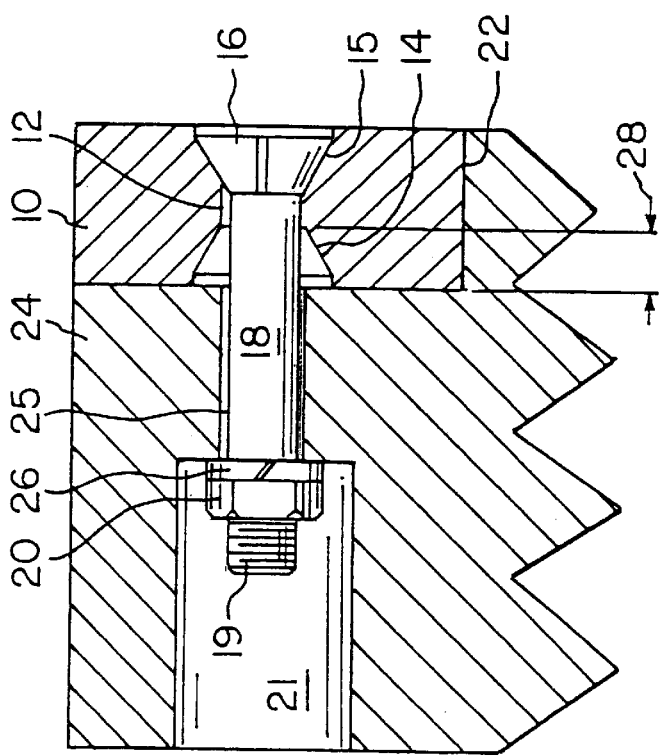
FIG. 1 is a sectional view of a blade insert attachment assembly according to the prior art.
Figure 4:
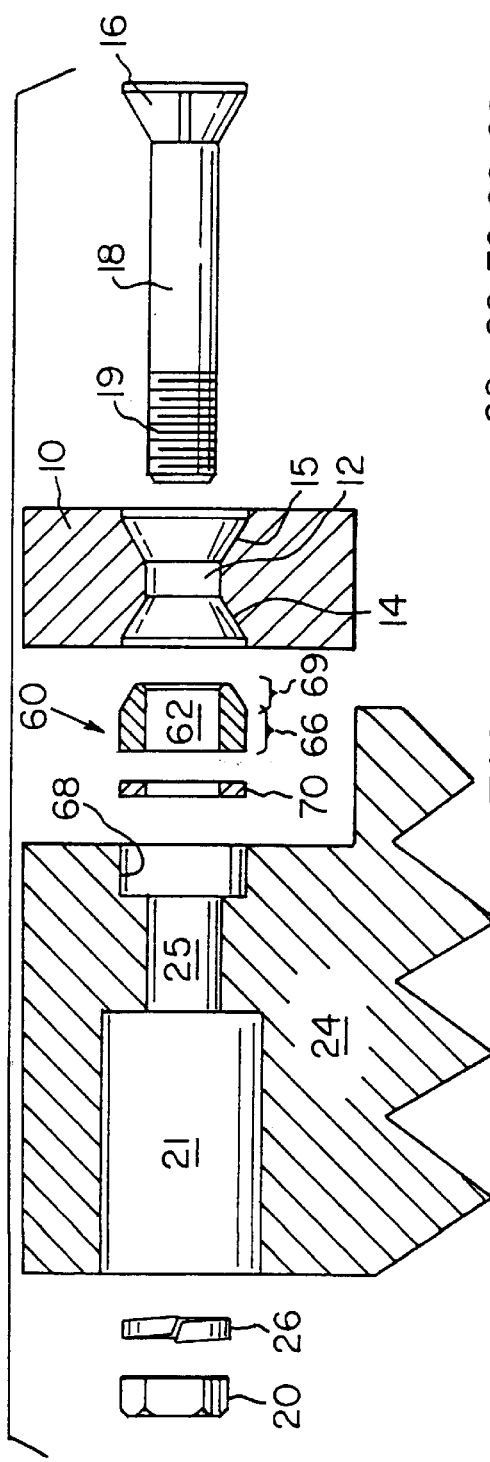
FIG. 4 is an exploded view of the blade insert attachment assembly illustrated in FIG. 3.
Figure 5:
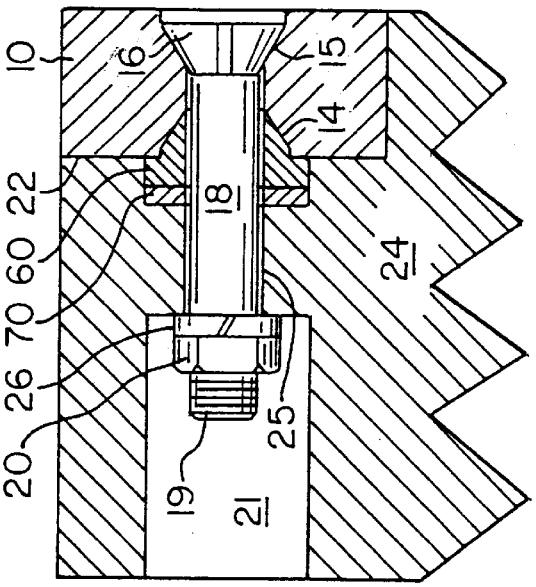
FIG. 5 is a sectional view of a modified blade insert attachment assembly of the heavy-duty shear illustrated in FIG. 1.

In one embodiment of the present invention, shown generally in FIGS. 3–5, the fixed blade 34 or movable blade 38 have an anvil portion 24 forming at least one blade insert seat 22, at least one anvil recess 21, and at least one bolt-receiving bore 25, wherein the bolt-receiving bore 25 extends from each blade insert seat 22 to each anvil recess 21. The bolt-receiving bore 25 may also form a support member seat 68 for receiving a rigid support member 60.

A reversible, indexable blade insert 10 is mounted in each blade insert seat 22. The blade insert 10 has at least one central bore 12 extending therethrough, the central bore 12 aligned with the bolt-receiving bore 25 of the anvil 24. Each central bore 12 has opposing recesses 14, 15 at each end thereof, and is secured to the anvil portion 24 of the fixed blade 34 or movable blade 38 by one or more plow bolts 18 extending therethrough as shown in greater detail in FIGS. 3–4. For the purposes of this application, the anvil 24 is the portion of the fixed blade 34 or the movable blade 38 to which the inserts 10 are attached. As shown in FIGS. 3–4, the plow bolt 18 extends through central bore 12 of the blade insert 10 such that the bolt head 16 is received within the outwardly facing recess 15 of the blade insert 10. The recesses 14 and 15 of the blade insert 10 are shaped to correspond to the shape of the bolt head 16. For example, the inwardly tapered frustoconical configuration of the recesses 14 and 15 shown in the figures corresponds to the frustoconical shape of the bolt head 16. Other shapes for the recesses 14 and 15 are possible, corresponding to other shapes of the bolt head 16. A high-collar lock washer 26 and a nut 20 are positioned in an anvil recess 21 and threadably engage the threaded end 19 of the plow bolt 18 to secure the blade insert 10 to the anvil 24 of the fixed blade 34 or movable blade 38. An anvil bolt-receiving bore 25 extends from the seat 22 to the anvil recess 21 and is aligned with central bore 12 for receiving the plow bolt 18 therethrough. Both the central bore 12 and the anvil bolt-receiving bore 25 are shaped to correspond to the shape of the body of the plow bolt 18.

The blade insert attachment assembly of the present invention additionally includes support member 60, preferably annular in shape, surrounding the plow bolt 18 and is at least partially received within an inwardly facing recess of the blade insert. The support member 60 is formed of hardened steel to provide a rigid support. As best shown in FIG. 4, the support member 60 includes a central bore 62 through a body of the support member 60 for receiving the plow bolt 18. The central bore 62, like the central bore 12 and the anvil bolt-receiving bore 25, is shaped to correspond to the shape of the body of the plow bolt 18. The support member 60 includes a front portion 64 having an outer peripheral shape which is tapered corresponding to the shape of the recesses 14 and 15 of the blade insert 10 as shown in the figures. The front portion 64 may be provided with other shapes corresponding to other shapes for the recesses 14 and 15 which, in turn, correspond to the shape of the bolt head 16. The support member 60 includes a rear portion 66 having a substantially cylindrical outer peripheral shape corresponding to the shape of a support member seat 68 which is formed in the bolt-receiving bore 25 of the anvil 24. Any other shape, such as square, hexagonal, etc., may be provided for the rear portion 66 and the corresponding support member seat 68. A shim pack 70, if needed, may be positioned surrounding the plow bolt 18 in the support member seat 68 between the anvil 24 and the support member 60 to move the support member 60 forward toward the insert seat 22 by an appropriate amount. The generally annular shim pack 70 has an outer surface corresponding to the shape of the rear portion 66 and an inner bore corresponding to the shape of the central bore 62. The shim pack 70 is provided to accommodate the blade insert 10, when sharpened, resulting in a decreased width of the blade insert 10.

Figure 6:
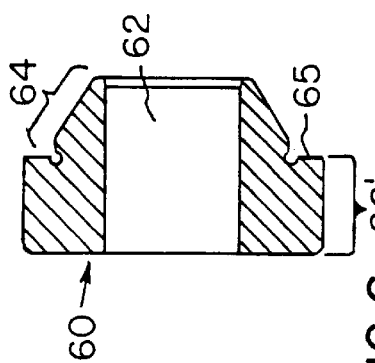
FIG. 6 is a side view of a support member of the modified blade insert attachment assembly of FIG. 5.
Figure 7:
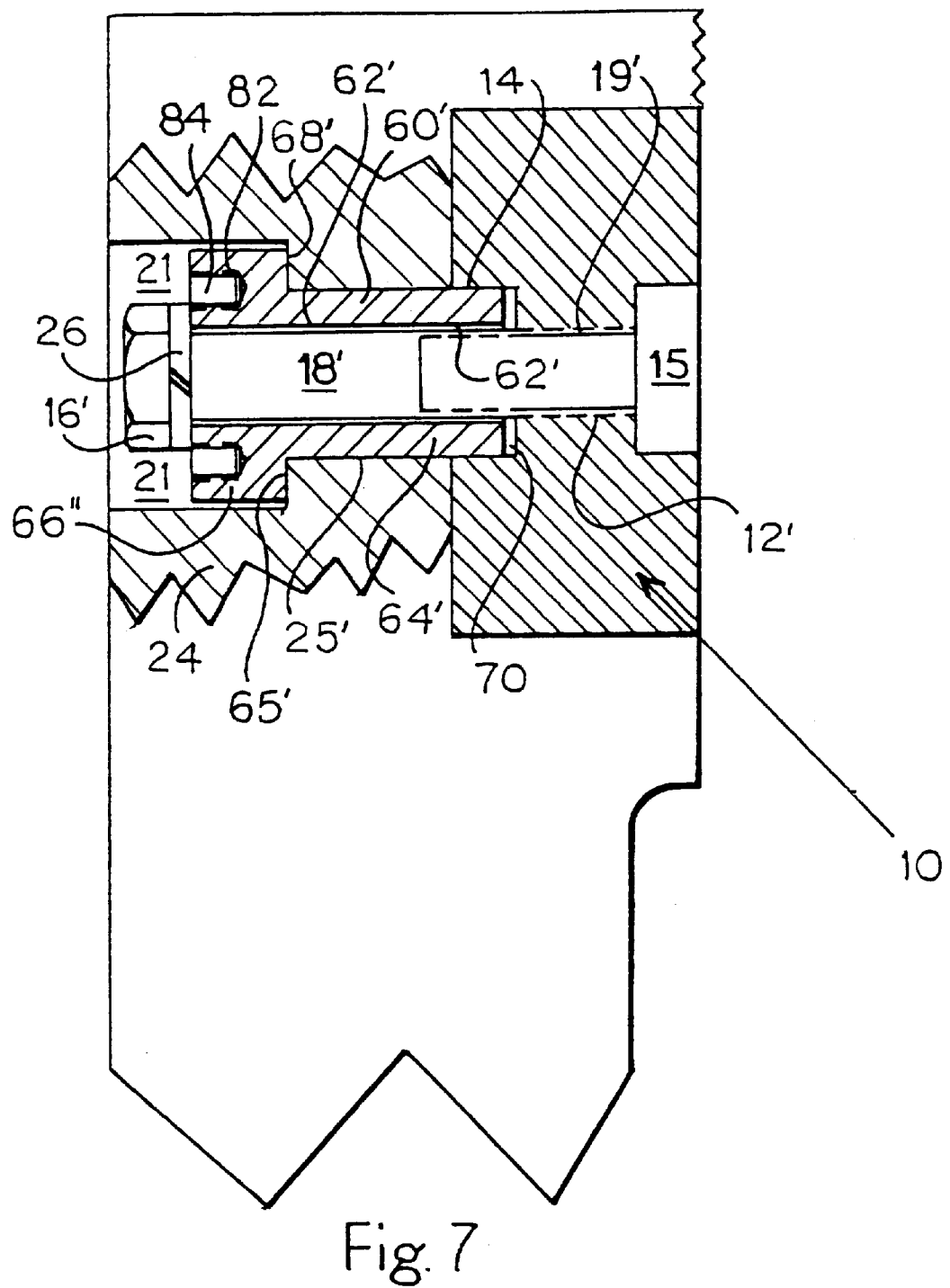
FIG. 7 is a sectional view of a heavy-duty shear according to a second embodiment of the present invention.
Figure 8:
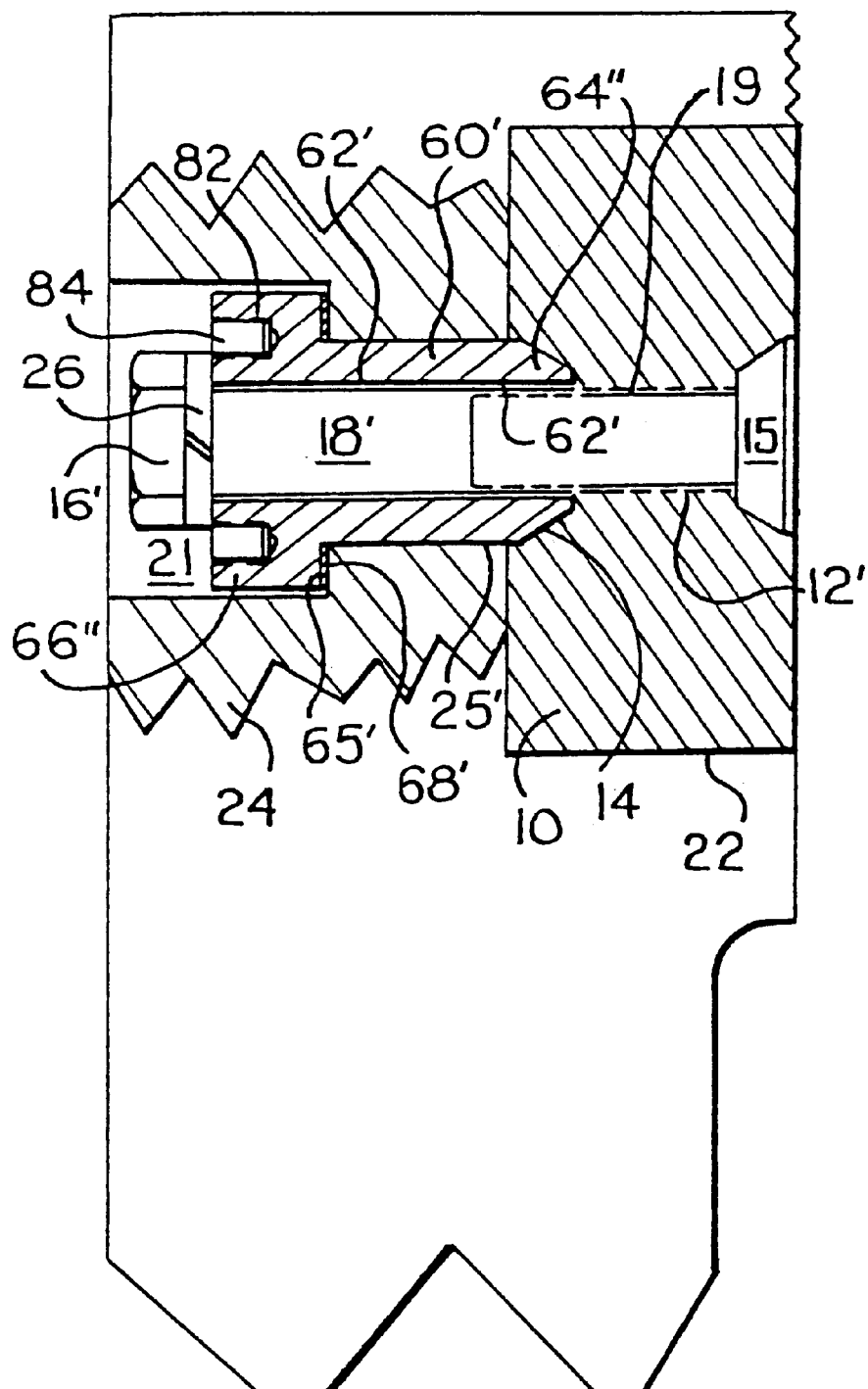
FIG. 8 is a sectional view of a modified heavy-duty shear according to FIG. 7 with a support member having a tapered forward portion and tapered blade insert recesses.

FIG. 5 illustrates a modified attachment assembly for the blade insert 10 according to the first embodiment of the present invention. The modified assembly in FIG. 5 forms the rear portion 66' of the support member 60 with a larger diameter than the front portion 64 which conforms to the shape of the recesses 14 and 15. The support member 60 of the modified assembly of FIG. 5 is shown in detail in FIG. 6. In this configuration, the support member 60 forms a step or offset 65 between the rear portion 661 and the front portion 64 of the support member 60. The offset 65 extends substantially perpendicular to the longitudinal length of the support member 60. The offset 65 further serves to locate the blade insert 10 as shown in FIG. 5. In the modification illustrated in FIG. 5, the support member seat 68 will be sized according to the rear portion 66', and the shim pack 70 will be sized according to the support member seat 68 as shown.

In a second embodiment of the present invention, shown generally in FIGS. 7–13 and with continuing reference to the first embodiment, the assembly has an anvil portion 24 forming at least one blade insert seat 22, at least one anvil recess 21, and at least one bolt-receiving bore 25'. The bolt-receiving bore 251 extends from the blade insert seat 22 to the anvil recess 21, and the bolt-receiving bore 25' may also form a support member seat 68' adjacent the anvil recess 21.

Figure 9:
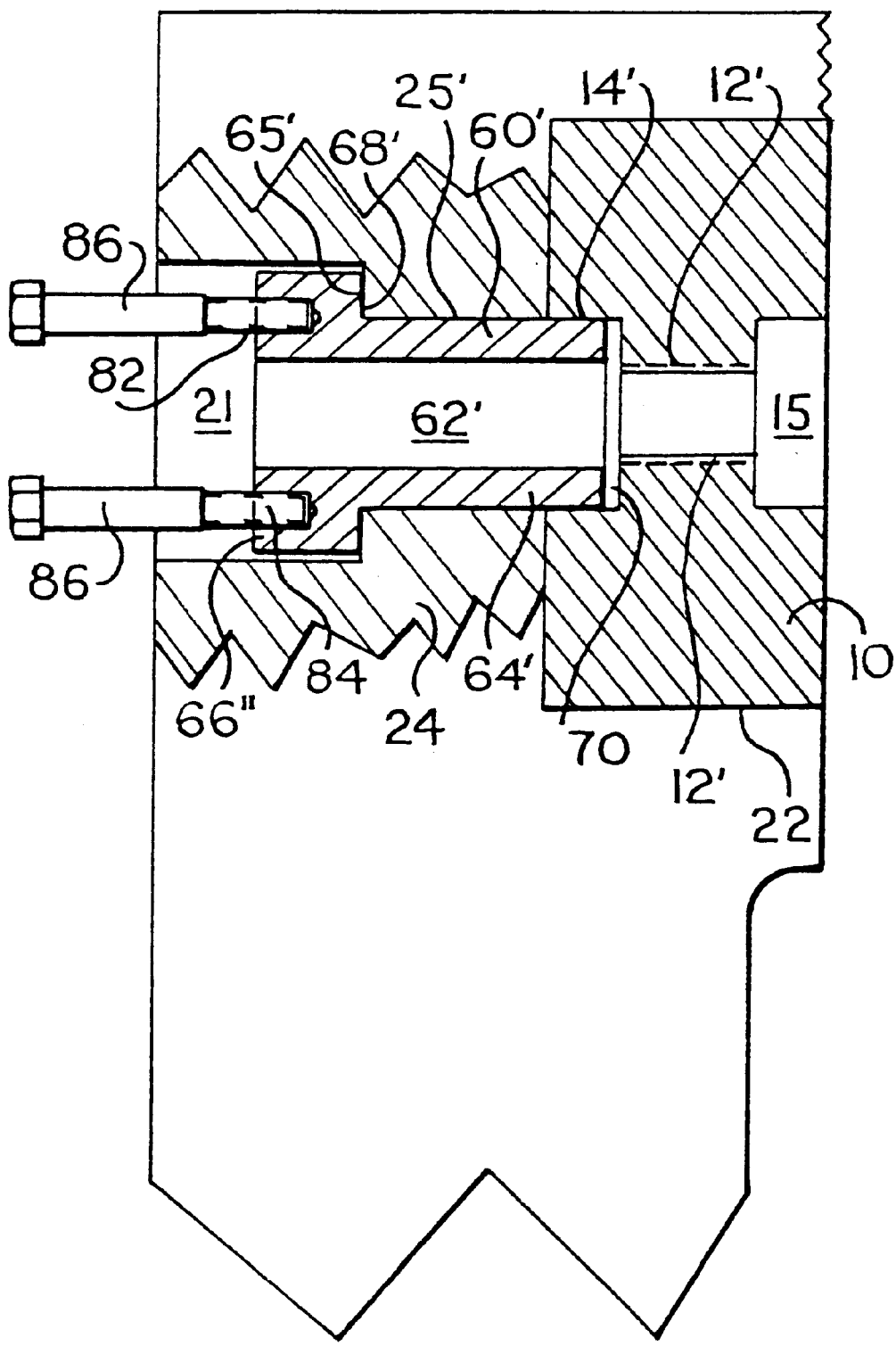
FIG. 9 is a sectional view of another modified heavy-duty shear according to FIG. 7, with a bolt removed and tap bolts inserted into tap guides on a rear portion of the support member.
Figure 10:
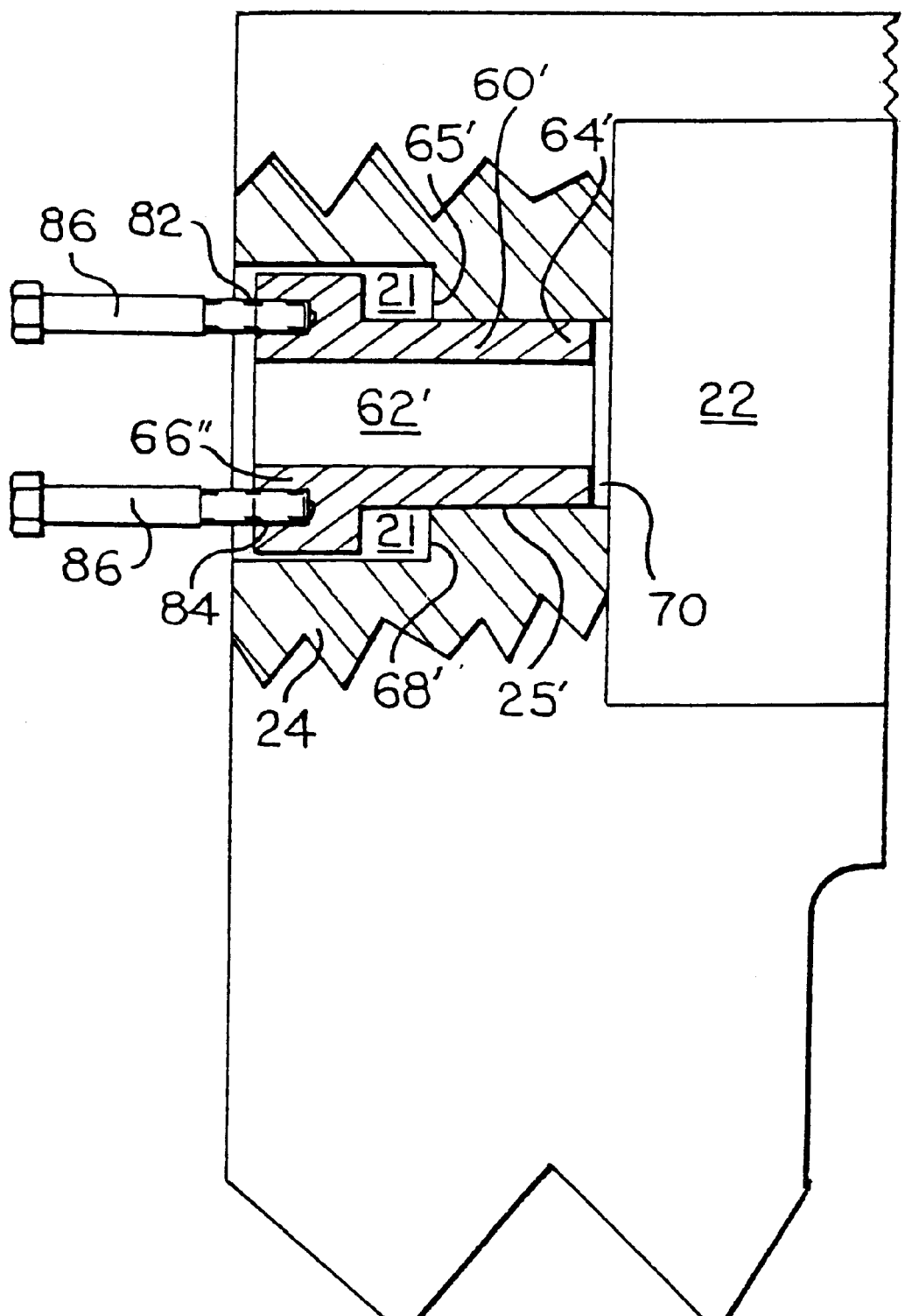
FIG. 10 is a sectional view of the heavy-duty shear according to FIG. 9 with the support member being withdrawn from a bolt-receiving bore.

A rigid support member 60' is at least partially received within the anvil recess 21 and the bolt-receiving bore 25'. The support member 60' is preferably annular in shape and has a front portion 64', a rear portion 66", and forms a central bore 62'. As shown in FIGS. 7–10 and 12 and 13, the rear portion 66" of the support member 60' may include tap guides 84 with threads 82 for receiving tap bolts 86. The tap guides 84 and tap bolts 86 assist in the removal and installation of the rigid support member 60', as shown in FIGS. 9 and 10.

Figure 11:
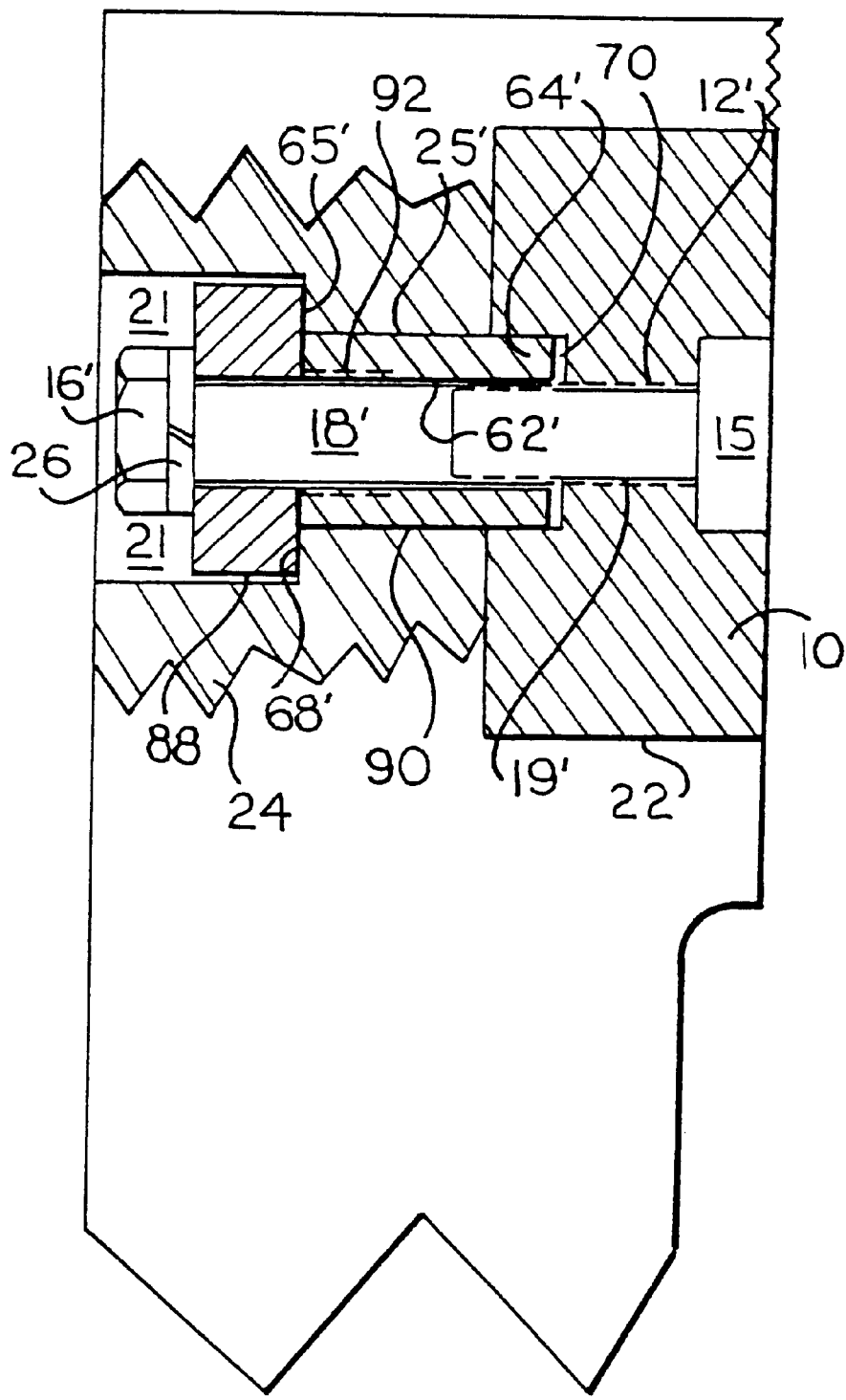
FIG. 11 is a sectional view of another modified heavy-duty shear according to FIG. 7 with the support member having two sections.
Figure 12:
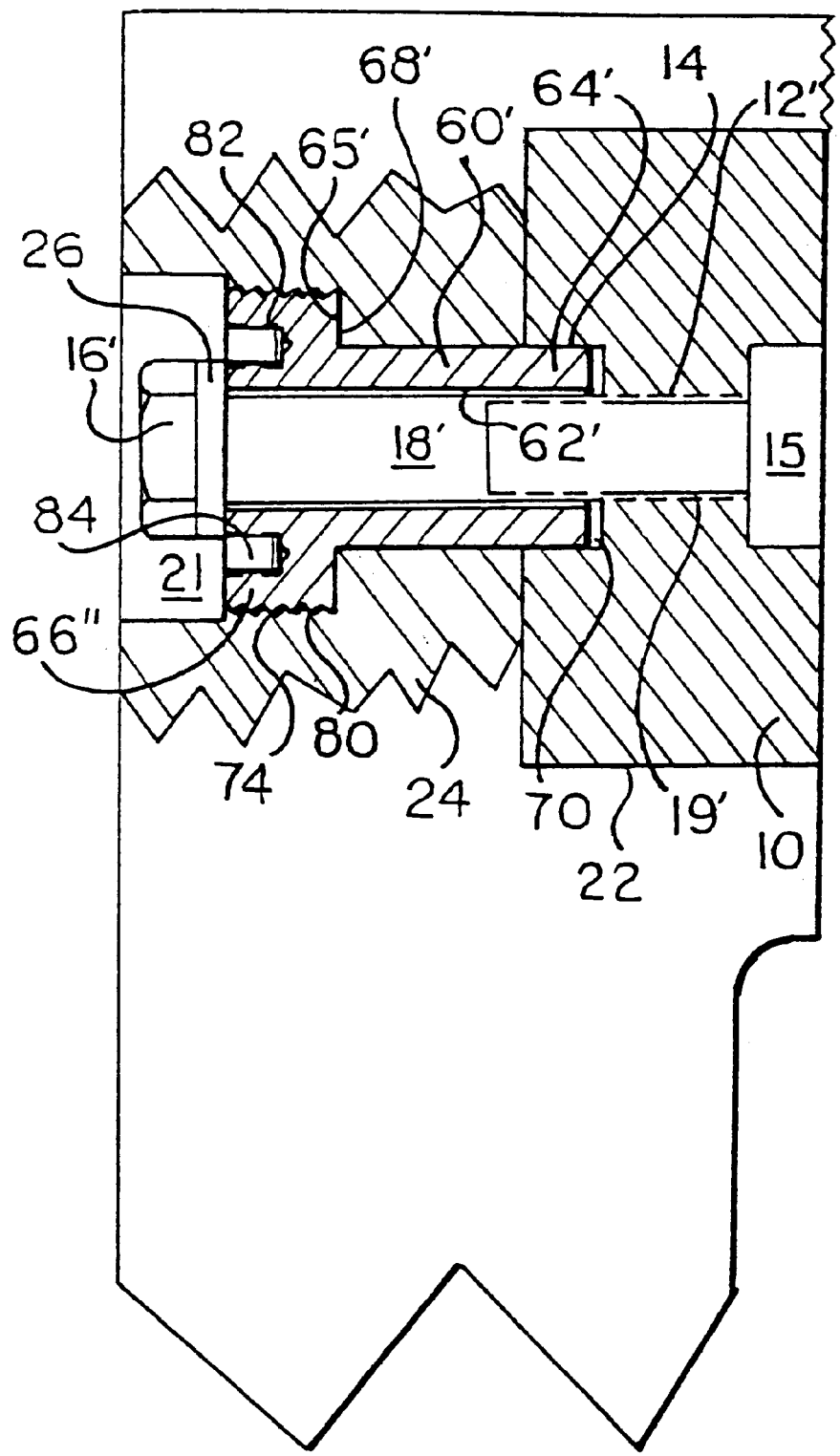
FIG. 12 is a sectional view of another modified heavy-duty shear according to FIG. 7 with the support member threadedly engaging an anvil recess.
Figure 13:
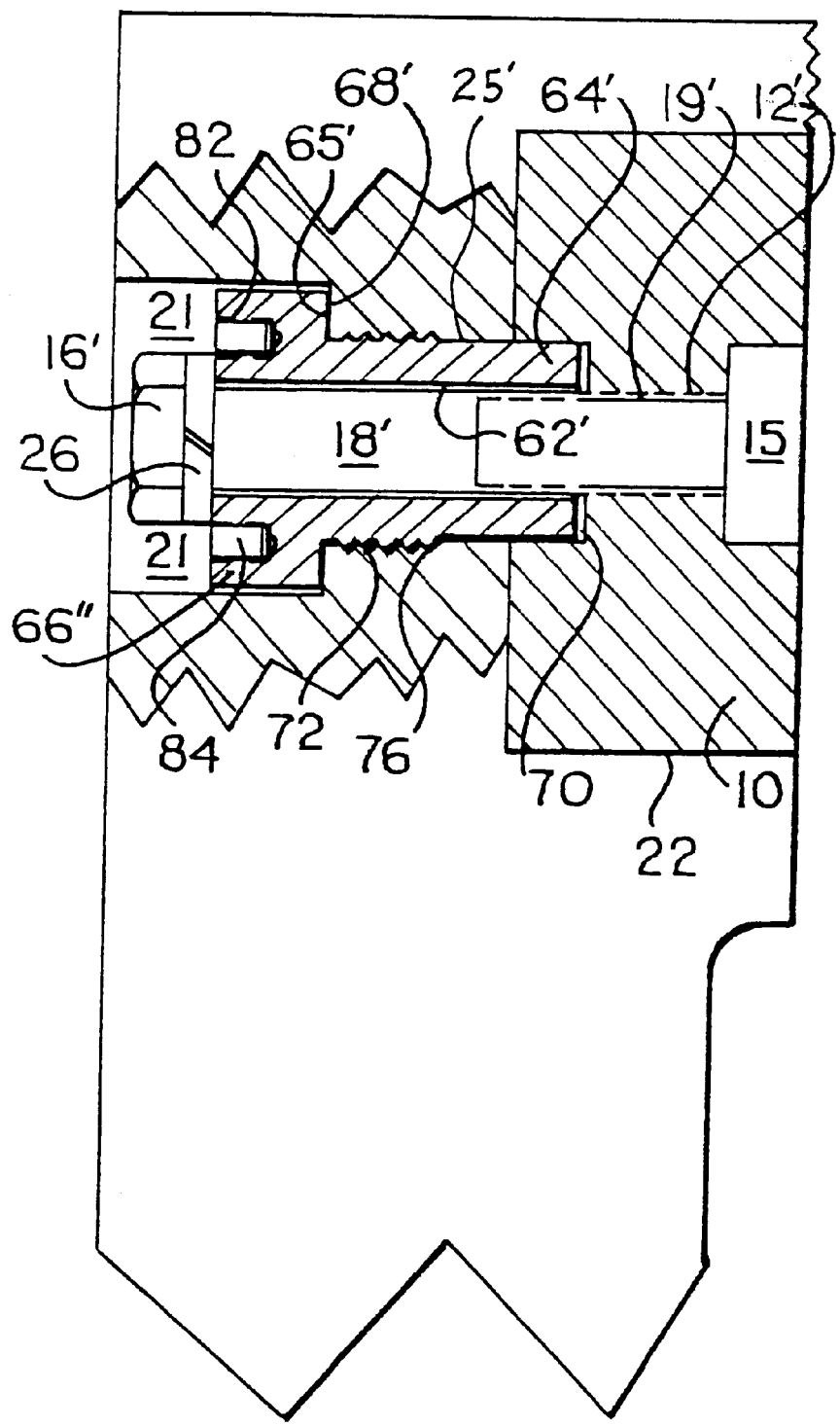
FIG. 13 is a sectional view of another modified heavy-duty shear according to FIG. 7 with the support member threadedly engaging a bolt-receiving recess.

As shown in FIGS. 7–13, the rear portion 64" of the support member 60' may have a step or offset 65' between the rear portion 66" and the forward portion 64' of the support member 60'. The offset 65' extends substantially perpendicular to the longitudinal length of the support member 60' and is received in the support member seat 68' formed by the bolt-receiving bore 25', adjacent the anvil recess 21. As shown in the modification of FIG. 12, the anvil recess 21 may form anvil recess threads 80 that threadedly connect with rear portion threads 74 positioned adjacent the rear portion 66" of the support member 60'. Alternatively, the bolt-receiving bore 25' may form bolt-receiving bore threads 76 that engage support member threads 72 positioned adjacent the support member 60' between said rear portion 66" and said forward portions 64', 64" as shown in the modification of FIG. 13. Additionally, the rigid support member 60' may include two or more pieces, such as a first rear piece 88, and a second forward piece 90, as shown in the modification of FIG. 11. The first and second pieces 88, 90 may be attached to one another such as shown schematically at 92.

A reversible blade insert 10 is mounted in each blade insert seat 22, the blade insert having at least one central bore 12' extending therethrough, aligned with the bolt-receiving bore 25' of the anvil 24, and the central bore 62' of the rigid support member 60'. Each central bore 12' is internally threaded and has opposing recesses 14, 15 at each end thereof, particularly inwardly facing recess 14 and outwardly facing recess 15 with respect to the anvil recess 21. As shown generally in FIGS. 6 and 9, the forward portions 64', 64" of support member 60' have an outer peripheral shape corresponding to the shape of the recesses 14, 15.

A plow bolt 18' extends through the central bore 62 of the support member 60', with a bolt head 16' of the bolt 18' positioned adjacent the anvil recess 21 and a threaded end 19' of the bolt 181 threadedly engaging the threaded central bore 12' of the blade insert 10. In this configuration, the bolt head 16' of the plow bolt 18' is accessible through the anvil recess 21, allowing tightening or removal of the bolt 18', even if the blade inserts 10 become obstructed by a workpiece, another movable blade, or other objects. Moreover, the recesses 14, 15 of the blade insert 10 interlock with the support member 60' and shelter the threaded end 19' of the bolt 18' from damage.

A shim pack 70, if needed, may be positioned surrounding the plow bolt 18' between the support member 60' and the inwardly facing recess 14 of the blade insert 10 to move the blade insert 10 away from the forward portion 64' of the support member 60' by an appropriate amount. The shim pack 70 has an outer surface corresponding to the shape of the recesses 14, 15 of the blade insert 10. The shim pack 70 is provided to accommodate the blade insert 10, when sharpened, resulting in a decreased width of the blade insert 10.

Figure 14:
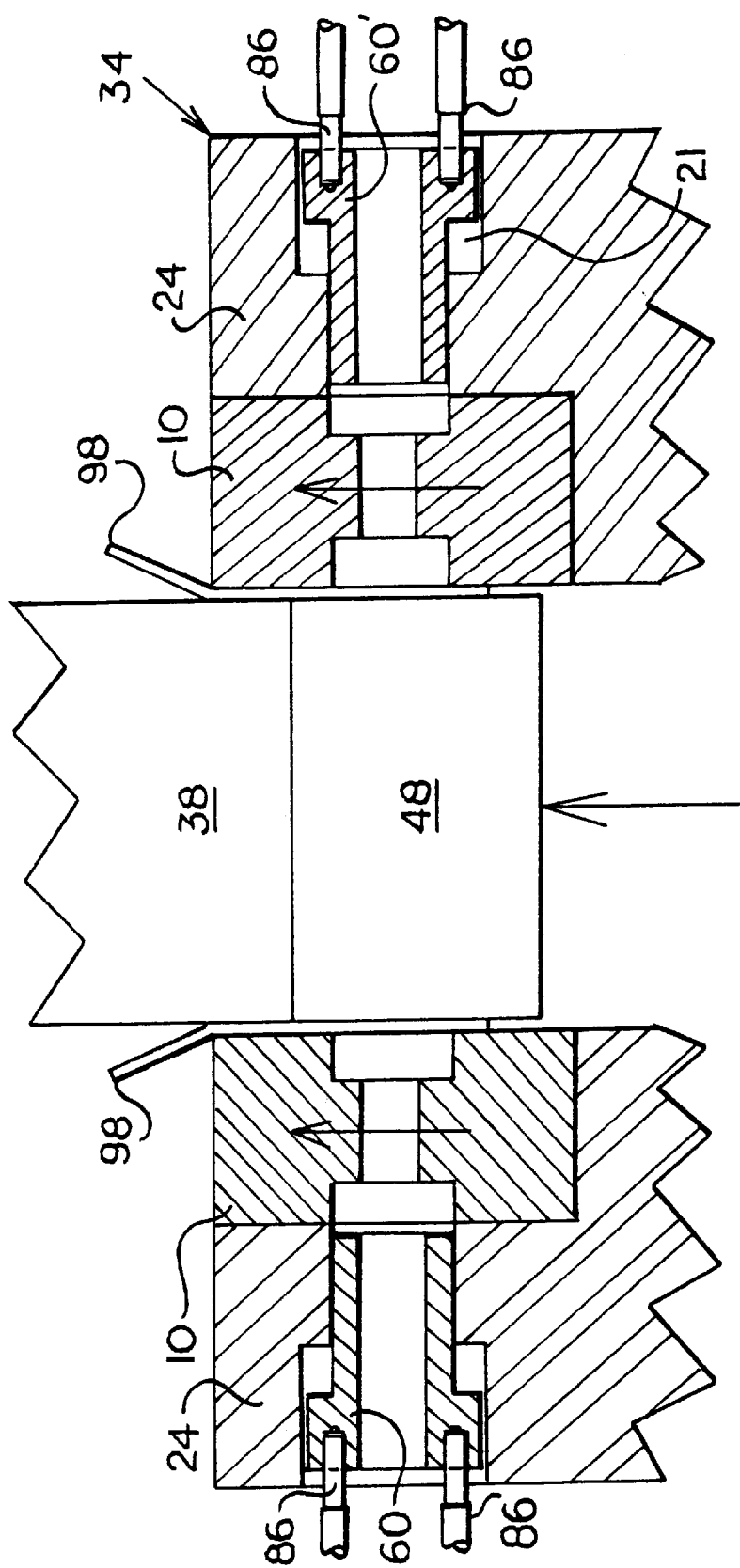
FIG. 14 is a sectional view of a heavy-duty shear according to FIG. 7 in a jammed condition.

The second embodiment of the present invention shown in the modifications illustrated in FIGS. 7–13 provide a mechanism for relieving a typical jam condition of the shear 30. As shown in FIG. 14, a thin workpiece 98 can become wedged between the fixed and movable blades 34 and 38 preventing relative movement between the blades 34 and 38 until the jam is removed. In prior art designs, access to the plow bolt 18 is prevented by the jammed condition. Shear operators have been known to impact the movable blade of prior art shears against the ground or the like to jar the jammed condition loose. This risks severely damaging the shear. The second embodiment of the present invention provides an alternative, safe and efficient mechanism for removing the jamming of the shear 30. In the second embodiment of the present invention, the plow bolt 18 can be removed by access through the anvil recess 21. Additionally, the support member 60' can be removed through the anvil recess 21 by using tap bolts 86 in top guides 84. With the plow bolt 18 removed and the support member 60' withdrawn as shown in FIG. 14, the movable blade 38 and the blade inserts 10 of the fixed blade 34 are free to move upward. Once the blade inserts 10 of the fixed blade 34 are above the blade insert seat 22 of the anvil portion 24, the workpiece 98 can be removed and the blade inserts 10 easily reinstalled in the fixed blade 34.

The support members 60, 60' of the present invention eliminate the unsupported section 28 of the prior art to more securely hold the blade insert 10 in the anvil 24. The support members 60, 60' can be easily positioned within the anvil 24 by chilling of the support members 60, 60', such as by liquid nitrogen, and hammering the support members 60, 60' into the support member seats 68, 68'. The arrangement of the present invention will provide a more positive location of the blade insert 10 than in the prior art blade insert attachment arrangement and will more efficiently transfer the load between the blade insert 10 and the anvil 24.

Pullout of the blade inserts 10 is most likely during double cutting with the rhombus-shaped blade inserts 10 of the fixed blade 34 being the most likely to be pulled out. The support members 60, 60' essentially act as a part of the anvil 24 and increase blade insert 10 to the anvil 24 surface friction to help prevent pullout of the blade insert 10. The provision of the optional shim pack 70 will allow for precise location of the blade inserts 10 within the seat 22 even after sharpening of the individual blade inserts 10.

It will be apparent to those of ordinary skill in the art that various modifications may be made to the present invention without departing from the spirit and scope thereof. Consequently, the scope of the present invention is intended to be defined by the appended claims and equivalents thereto.

What is claimed is:

1. A shear blade for a heavy-duty shear comprising:
   an anvil portion forming at least one blade insert seat, at least one anvil recess, and at least one bolt-receiving bore, wherein said bolt-receiving bore extends from each said blade insert seat to each said anvil recess;
   a reversible blade insert mounted in each said blade insert seat, said blade insert having at least one central bore extending therethrough aligned with one said bolt-receiving bore of said anvil, each central bore having opposing recesses at each end thereof;
   a rigid support member forming a central bore, said support member at least partially received within said bolt-receiving bore and within said recess of said blade insert; and
   a bolt extending through said central bore of said rigid support member and into said central bore of said blade insert.

2. The shear blade of claim 1 wherein said bolt-receiving bore forms a support member seat.

3. The shear blade of claim 2 wherein said support member seat is positioned opposite said anvil recess and adjacent an inwardly facing recess of said blade insert.

4. The shear blade of claim 2 wherein said support member seat is positioned adjacent said anvil recess.

5. The shear blade of claim 1 wherein said support member has an offset between a rear portion and a forward portion of the support member, wherein said offset extends substantially perpendicular to a longitudinal length of said support member.

6. The shear blade of claim 1 wherein said support member includes a forward portion having an outer configuration corresponding to a configuration of said recess of said blade insert.

7. The shear blade of claim 6 wherein said forward portion of said support member is tapered along a substantial length thereof.

8. The shear blade of claim 1 wherein a rear portion of said support member is cylindrical.

9. The shear blade of claim 1 wherein a rear portion of said support member has tap guides.

10. The shear blade of claim 9 wherein said tap guides are threaded.

11. The shear blade of claim 1 wherein said support member extends the length of the bolt-receiving bore.

12. The shear blade of claim 1 wherein said bolt has a head accessible through said anvil recess.

13. The shear blade of claim 1 wherein said bolt and said support member are removeable from said anvil recess.

14. A shear blade for a heavy-duty shear comprising:
   an anvil portion forming at least one blade insert seat, at least one anvil recess, and at least one bolt-receiving bore, wherein said bolt-receiving bore extends from said blade insert seat to said anvil recess and forms a support member seat adjacent said anvil recess;
   a reversible blade insert mounted on each said blade insert seat, each said blade insert having at least one central bore extending therethrough, said central bore aligned with one said bolt-receiving bore of said anvil and a central bore of a support member, wherein each central bore is internally threaded and has opposing recesses at each end thereof;

a rigid support member having a forward portion, a rear portion, an offset between said rear portion and said forward portion, and forming a central bore, said forward portion having an outer configuration corresponding to a configuration of said recesses of said blade insert and said rear portion, wherein said rigid support member is at least partially received within said anvil recess, extends through said bolt-receiving bore, and is at least partially received in one said recess of said reversible insert, said offset extending substantially perpendicular to a longitudinal length of said support member and received in said support member seat; and a bolt extending through said central bore of said rigid support member, a head of said bolt positioned adjacent said anvil recess and a threaded end of said bolt threadedly engaging said threaded central bore of said blade insert.

15. The shear blade of claim 14 wherein said anvil recess forms anvil recess threads that threadedly connect with rear portion threads positioned adjacent said rear portion of said support member.

16. The shear blade of claim 14 wherein said bolt-receiving bore forms bolt-receiving bore threads that engage support member threads positioned adjacent said support member between said rear portion and said forward portion.

17. The shear blade of claim 14 wherein said support member includes a first rear piece and a second forward piece.

18. The shear blade of claim 16 wherein said first rear piece and said second forward piece are attached.

19. A heavy-duty shear adapted to be attached to a backhoe, said shear comprising:

a fixed anvil portion;

a movable anvil portion pivotally attached to said fixed blade:

at least one blade insert seat, at least one anvil recess, and at least one bolt-receiving bore on said fixed and said movable anvils, wherein said bolt-receiving bore extends from each said blade insert seat to said anvil recess and forms a support member seat adjacent said anvil recess;

a reversible blade insert mounted in each said blade insert seat, said blade insert having at least one central bore extending therethrough and aligned with one said bolt-receiving bore of said anvil, each central bore having a threaded portion and opposing recesses at each end thereof;

a rigid support member at least partially received within said support member seat on said recess of said reversible insert; and a bolt extending through said rigid support member and each said central bore of said blade insert, wherein a head of said bolt is positioned adjacent said rigid support member and a threaded end of said bolt is threadedly attached to said threaded portion of at least one said blade insert.

20. The shear blade of claim 18 wherein a rear portion of said support member has threaded tap guides.

* * * * *

UNITED STATES PATENT AND TRADEMARK OFFICE
CERTIFICATE OF CORRECTION

| | |
|---|---|
| PATENT NO. : 6,202,308 B1 | Page 1 of 1 |
| DATED : March 20, 2001 | |
| INVENTOR(S) : John R. Ramun | |

It is certified that error appears in the above-identified patent and that said Letters Patent is hereby corrected as shown below:

Title page,
Insert after Assignee information:
-- (*) Notice: The term of this patent shall not extend beyond the expiration date of Patent No. 5,940,971. --

Column 6,
Line 9, "661" should read -- 66' --.
Line 22, "251" should read -- 25' --.

Column 7,
Line 4, "181" should read -- 18' --.

Signed and Sealed this

Thirtieth Day of October, 2001

*Attest:*

*Attesting Officer*

NICHOLAS P. GODICI
*Acting Director of the United States Patent and Trademark Office*